(12) United States Patent
Galbreath et al.

(10) Patent No.: US 10,759,312 B2
(45) Date of Patent: Sep. 1, 2020

(54) VEHICLE TRIM ASSEMBLY FOR USE WITH HEATING AND COOLING OF A VEHICLE SEAT

(71) Applicant: Lear Corporation, Southfield, MI (US)

(72) Inventors: Ashford Allen Galbreath, Troy, MI (US); Arjun Yetukuri, Rochester Hills, MI (US); Paul Olivier, Mataro (ES); Colin Andrew Paton-Phillips, Bayern (DE); David Gallagher, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 106 days.

(21) Appl. No.: 15/848,428

(22) Filed: Dec. 20, 2017

(65) Prior Publication Data
US 2019/0184869 A1 Jun. 20, 2019

(51) Int. Cl.
| | | |
|---|---|---|
| *F25B 21/00* | (2006.01) | |
| *F25B 21/02* | (2006.01) | |
| *F25B 21/04* | (2006.01) | |
| *B60N 2/58* | (2006.01) | |
| *B60N 2/56* | (2006.01) | |
| *B60H 1/00* | (2006.01) | |

(52) U.S. Cl.
CPC ....... *B60N 2/5692* (2013.01); *B60H 1/00285* (2013.01); *B60H 1/00478* (2013.01); *B60N 2/5642* (2013.01); *B60N 2/5678* (2013.01); *B60N 2/58* (2013.01)

(58) Field of Classification Search
CPC ...... F25B 21/02; F25B 21/04; F25B 2321/02; B60H 1/00285; B60H 1/00478; B60N 2/5642; B60N 2/5678; B60N 2/58; B60N 2/5692
See application file for complete search history.

(56) References Cited

U.S. PATENT DOCUMENTS 3,648,469 A * 3/1972 Chapman ............. A47G 9/1036
62/3.5
4,738,113 A * 4/1988 Rudick ................... F25B 21/02
62/3.5
(Continued)

FOREIGN PATENT DOCUMENTS

DE 10346064 A1 4/2005
EP 2617072 A1 7/2013
(Continued)

*Primary Examiner* — Frantz F Jules
*Assistant Examiner* — Erik Mendoza-Wilkenfel
(74) *Attorney, Agent, or Firm* — MacMillan, Sobanski & Todd, LLC (57) ABSTRACT

A vehicle trim assembly comprises a foam bun, an electrically insulative top finish layer above the foam bun, a thermal gradient assembly under the finish trim layer, and a thermal enhancement layer between the thermal gradient assembly and the finish trim layer. The thermal gradient assembly is adapted to generate a thermal gradient when receiving an electric current and has an electrically conductive top layer, an electrically conductive bottom layer, and a semiconductor layer having first and second semiconductor regions between the top and bottom layers. The thermal enhancement layer has a thermal conductivity adapted to direct thermal energy transfer between the thermal gradient assembly and the finish trim layer.

10 Claims, 9 Drawing Sheets

(56) References Cited

U.S. PATENT DOCUMENTS

| | | |
|---|---|---|
| 6,541,737 B1 | 4/2003 | Eksin et al. |
| 8,230,689 B2 | 7/2012 | Kmetz et al. |
| 9,028,137 B2 | 5/2015 | Sjölund et al. |
| 2012/0174956 A1* | 7/2012 | Smythe .................. H01L 35/08 |
| 2014/0304921 A1* | 10/2014 | Collins .................. A47C 27/15 5/727 |
| 2015/0266405 A1 | 9/2015 | Fitzpatrick et al. |
| 2016/0009206 A1 | 1/2016 | Perraut et al. |
| 2016/0030233 A1* | 2/2016 | Millar ..................... A61F 7/007 607/109 |
| 2018/0229632 A1* | 8/2018 | Line ....................... F25B 21/02 |

FOREIGN PATENT DOCUMENTS

| | | |
|---|---|---|
| WO | 01/30606 A1 | 5/2001 |
| WO | 2012/037031 A1 | 3/2012 |

* cited by examiner

VEHICLE TRIM ASSEMBLY FOR USE WITH HEATING AND COOLING OF A VEHICLE SEAT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle trim assemblies and, more specifically, to a vehicle trim assembly for use with heating and cooling of a vehicle seat.

Seats in automotive vehicles increasingly have systems that provide heating and cooling for occupants of the vehicle seats. The vehicle seats typically comprise a foam bun wrapped or otherwise covered in a finish trim. The finish trim may be a synthetic material such as synthetic leather. Other seat materials may also be provided between the finish trim and the foam bun. The heating and cooling system typically includes a thermal device in the foam bun to provide the heating and cooling. However, the finish trim and other seat materials have a thermal insulating effect that reduces efficiency of the thermal device providing the heating or cooling to the occupants. The reduced efficiency results in added complexity, weight, and cost for the heating and cooling system. Thus, it would be desirable to provide more efficient heating and cooling of the vehicle seats.

SUMMARY OF THE INVENTION

This invention includes a vehicle trim assembly having a foam bun, an electrically insulative top finish layer above the foam bun, a thermal gradient assembly under the finish trim layer, and a thermal enhancement layer between the thermal gradient assembly and the finish trim layer. The thermal gradient assembly is adapted to generate a thermal gradient when receiving an electric current according to the Peltier effect. The thermal gradient assembly has an electrically conductive top layer, an electrically conductive bottom layer, and a semiconductor layer having first and second semiconductor regions between the top and bottom layers. The thermal enhancement layer has a thermal conductivity adapted to direct thermal energy transfer between the thermal gradient assembly and the finish trim layer.

The thermal enhancement layer may include a polyurethane foam layer. An additive material may be provided in the polyurethane layer to direct thermal energy transfer through the thermal enhancement layer. The thermal enhancement layer may also (or alternatively) include a silicone rubber layer. A filler material may be provided in the silicone rubber layer to direct the thermal energy transfer through the thermal enhancement layer.

At least one of the first or second semiconductor regions may be fabricated from an extrinsic foam material containing doped particles. Alternatively, at least one of the first or second semiconductor regions may be fabricated from a flexible sheet containing doped chips.

Channels may be provided through the vehicle trim assembly for fluid circulation. As a non-limiting example, the fluid may be air. A heat source or heat sink may be in thermal communication with the thermal gradient assembly via the fluid circulation. The heat source or heat sink may be a single heat exchanger device such as a radiator, and in thermal communication with an ambient environment, such as cabin air in a passenger compartment of a vehicle. When the bottom layer has a greater thickness than the top layer, the bottom layer may be configured as a thermal energy well.

The thermal gradient assembly and foam bun may be fabricated separately and then secured together. As a non-limiting example, the thermal gradient assembly and the foam bun may be secured together by an adhesive layer. The vehicle trim assembly may be fabricated by a molding process. The molding process may use multi-density foam to fabricate the thermal gradient assembly in a single molding operation. Furthermore, the thermal gradient assembly may be fabricated with the foam bun in a single molding operation.

DETAILED DESCRIPTION OF THE PREFERRED EMBODIMENT

Figure 1:
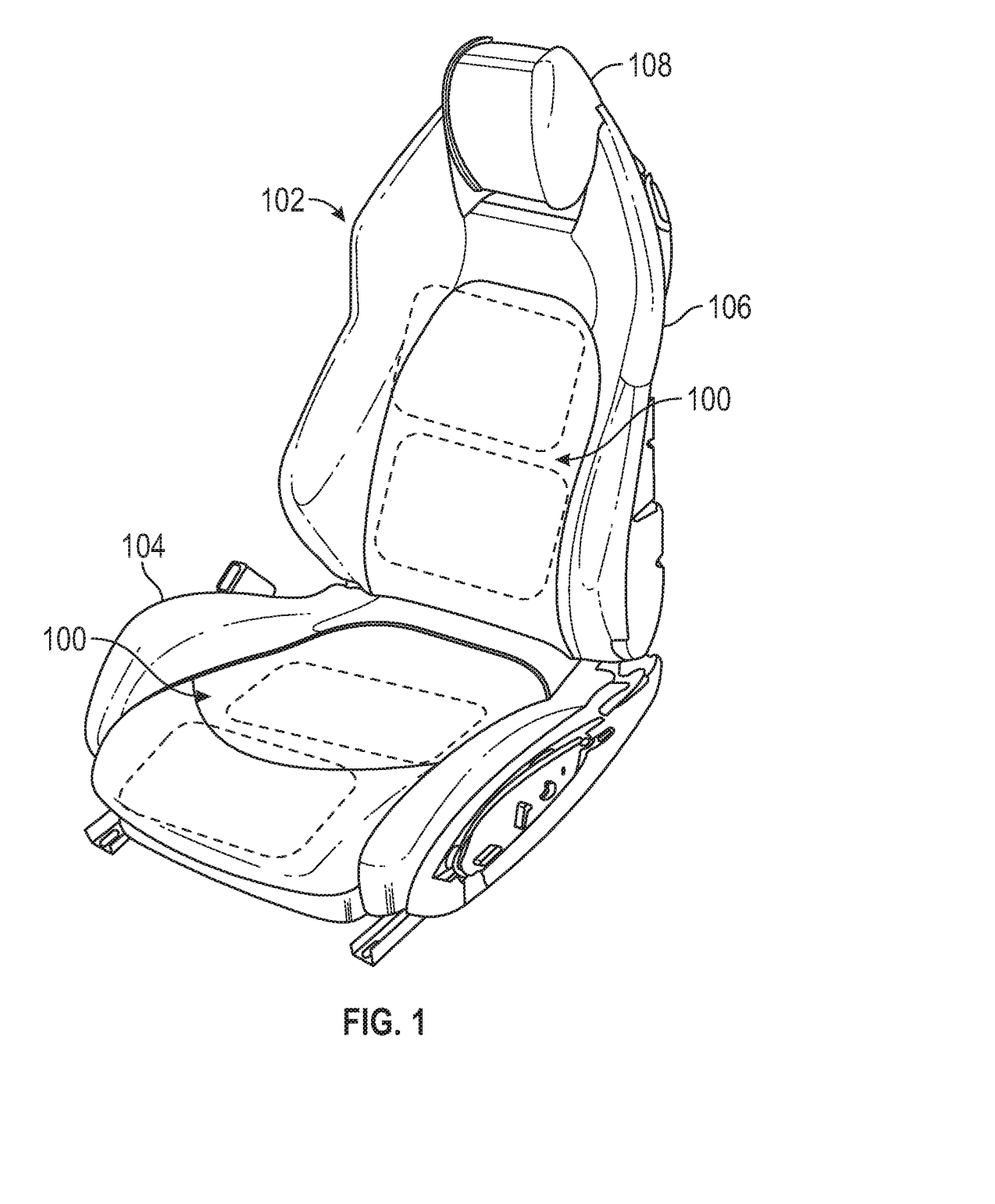
FIG. 1 is a perspective view showing a vehicle seat having a vehicle trim assembly according to an embodiment of the present invention.

Referring now to FIG. 1, there are illustrated vehicle trim assemblies, indicated generally at 100, according to an embodiment of the present invention. The vehicle trim assemblies 100 are for a vehicle seat, indicated generally at 102, and direct thermal energy to provide heating and cooling of the vehicle seat 102. The vehicle seat 102 has a seat bottom 104 and a seat back 106 mounted to the seat bottom 104. Attached to the seat back 106 is a headrest 108. Each of the vehicle trim assemblies 100 is not limited to use with the particular vehicle seat 102 illustrated in FIG. 1, and the vehicle seat 102 is not limited to the specific structure or appearance illustrated in FIG. 1.

As illustrated, two of the vehicle trim assemblies 100 are located within the seat bottom 104, and two of the vehicle trim assemblies 100 are located within the seat back 106. Alternatively, the quantities and positions of the vehicle trim assemblies 100 may be other than as shown. As non-limiting examples, the seat bottom 104 and the seat back 106 may each have fewer or more than the two vehicle trim assemblies 100 shown for each. Discussion of one of the vehicle trim assemblies 100 applies to the others unless otherwise noted. Discussion of one of the vehicle trim assemblies 100 applies to the vehicle trim assemblies 100 in the seat bottom 104 or the seat back 106.

Figure 2:
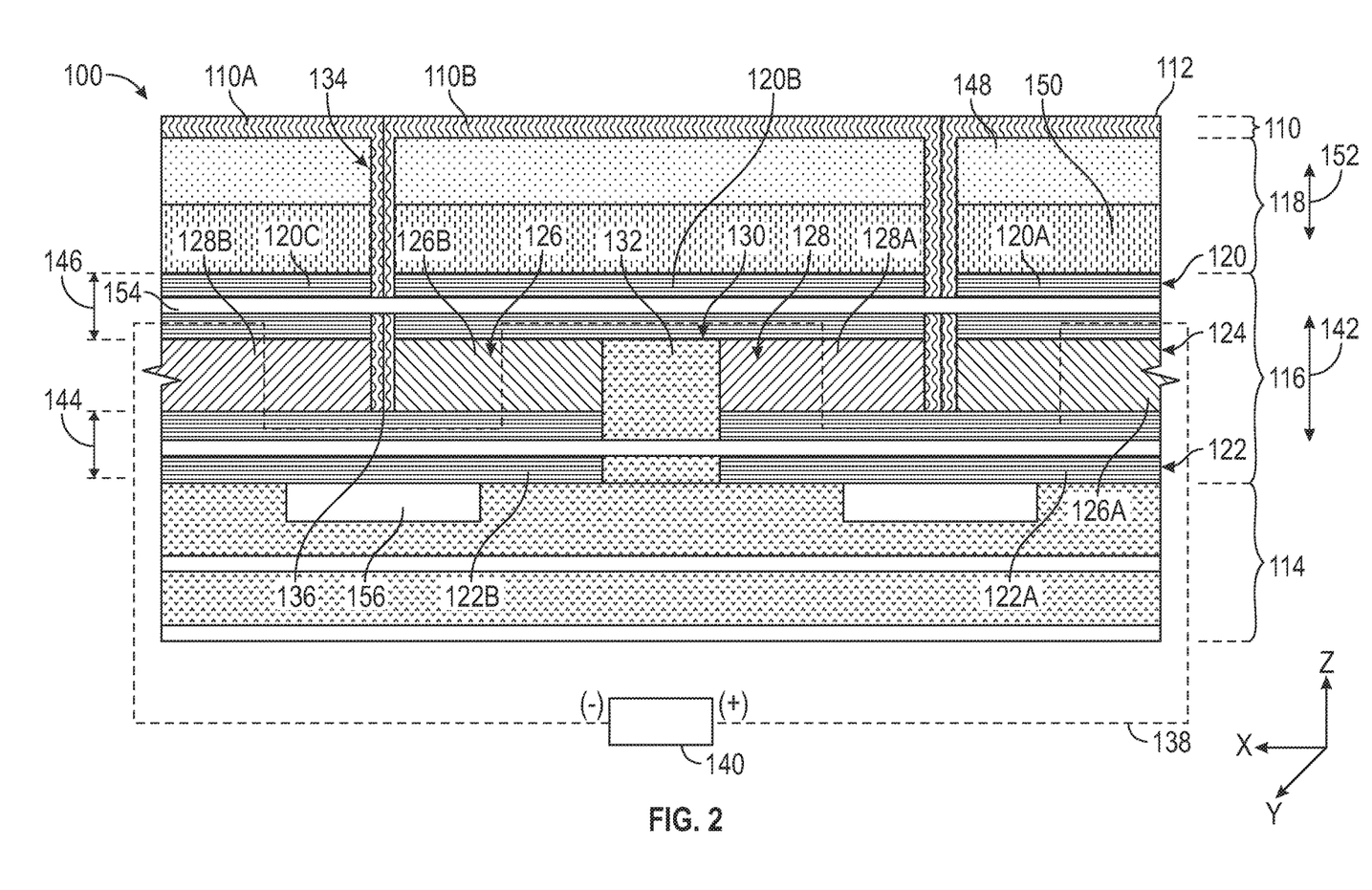
FIG. 2 is a schematic cross section of the vehicle trim assembly of FIG. 1 having a thermal gradient assembly and a thermal enhancement layer.

Referring now to FIG. 2, there is illustrated a schematic cross section view taken through one of the vehicle trim assemblies 100. Each of the vehicle trim assemblies 100 comprises multiple layers of material. The material layers each extend in an X-Y plane and are stacked or layered such that the vehicle trim assembly 100 has a height in a direction Z normal to the X-Y planes. The X-Y planes for different components of the vehicle seat 102—i.e., the seat bottom 104 and the seat back 106—are defined such that loading of the vehicle seat 102 by an occupant of the vehicle seat 102 is generally in the Z direction. Each of the vehicle trim assemblies 100 is not limited to the material layers that will be discussed.

Two of the material layers of the vehicle trim assembly 100 are a finish trim layer 110 and a foam bun 114. The finish trim layer 110 wraps or otherwise covers the foam bun 114. The finish trim layer 110 preferably at least wraps sides of the foam bun 114 on which the occupant sits.

The finish trim layer 110 has an outer surface with finish trim 112. The occupant is in contact with the finish trim 112 while occupying—e.g., sitting in—the vehicle seat 102. Preferably, the finish trim 112 is an electrically insulating material. Alternatively, an insulating layer may be provided beneath the finish trim 112. As non-limiting examples, the finish trim 112 may be natural leather, synthetic leather, cloth, or vinyl.

The foam bun 114 supports the finish trim layer 110 and provides cushioning to the occupant. As a non-limiting example, the foam bun 114 may be fabricated from polyurethane (PUR) foam. Alternatively, a cushioning structure other than the foam bun 114 may be used, or the foam bun 114 may be omitted. The foam bun 114 is supported on a frame structure (not shown) that supports the vehicle seat 102 in a vehicle. Preferably, the finish trim layer 110 and the foam bun 114 are not limited to the vehicle trim assemblies 100, but instead extend beyond to portions of the seat bottom 104 or seat back 106 without the vehicle trim assemblies 100.

Between the finish trim layer 110 and the foam bun 114 are additional material layers in the X-Y plane comprising a thermal gradient assembly 116 and a thermal enhancement layer 118. As illustrated, the thermal gradient assembly 116 is in contact with, and supported by, the foam bun 114 and the thermal enhancement layer 116 is between the thermal gradient assembly 116 and the finish trim layer 110. Alternatively, the thermal gradient assembly 116 and the thermal enhancement layer 118 may be positioned other than as shown, or one of the thermal gradient assembly 116 or thermal enhancement layer 118 may be omitted from the vehicle trim assembly 100. Each of the thermal gradient assembly 116 and the thermal enhancement layer 118 will be discussed further in detail.

The thermal gradient assembly 116 has an electrically conductive top layer, indicated generally at 120, an electrically conductive bottom layer, indicated generally at 122, and a semiconductor layer, indicated generally at 124, between the top and bottom layers 120 and 122, respectively. The bottom layer 122 may be incorporated into the foam bun 114. As non-limiting examples, each of the top or bottom layers 120 or 122, respectively, may be reticulated foam or spacer fabric. The reticulated foam and spacer fabric are porous and, for a purpose to be discussed, allow air or other fluid flow.

The semiconductor layer 124 has a matrix of alternating dissimilar first and second semiconductor regions, indicated generally at 126 and 128 respectively. The semiconductor matrix extends in the X-Y plane and the first and second semiconductor regions 126 and 128, respectively, alternate in both the X and Y directions. The result is a checkerboard arrangement of the semiconductor matrix. As non-limiting examples, the first and second semiconductor regions 126 and 128, respectively, may be solid, thin film, fabric, carbon nanotube, and/or printed ink extrinsic semiconductor pairs. Preferably, the first semiconductor regions 126 are one of n-type or p-type semiconductors, and the second semiconductor regions 128 are the other such that the first and second semiconductor regions 126 and 128, respectively, have different types of semiconductors.

Insulating gaps or trenches are provided between the first and second semiconductor regions 126 and 128, respectively, in the semiconductor layer 124. Preferably, the insulating gaps are filled with insulating material to protect against short circuits between adjacent first and second semiconductor regions 126 and 128, respectively. The first and second semiconductor regions 126 and 128, respectively, are of opposite types—e.g., n-type or p-type—on either side of the insulating gaps.

A first insulating gap, indicated generally at 130, is representative of the insulating gaps that extend into the thermal gradient assembly 116 from a side of the thermal gradient assembly 116 facing the foam bun 114. The first insulating gap 130 extends through the bottom layer 122 and the semiconductor layer 124. The first insulating gap is filled with insulating foam material 132. As illustrated, the insulating foam material 132 is separate from the foam bun 114. Alternatively, when the foam bun 114 is fabricated from insulating foam, the insulating foam material 132 may be an extension or continuous part of the foam bun 114.

A second insulating gap, indicated generally at 134, is representative of the insulating gaps that extend into the thermal gradient assembly 116 from a side of the thermal enhancement layer 118 facing the finish trim layer 110. The second insulating gap 134 extends through the thermal enhancement layer 118, the top layer 120, and the semiconductor layer 124. The finish trim layer 110 extends into the second insulating gap 134 to provide insulation at the top layer 120 and semiconductor layer 124. As illustrated, first and second finish trim pieces 110A and 110B, respectively, extend into the second insulating gap 134 such that their non-electrically conductive finish trim 112 faces and contacts each other. The first and second trim pieces 110A and 110B, respectively, are joined in the second insulating gap 134 at a seam 136. Alternatively, the seam 136 may be omitted such that the first and second finish trim pieces 110A and 110B, respectively, are not joined, or the first and second trim pieces 110A and 110B, respectively, may be a single trim piece that is continuous at the location of the seam 136. The second insulating gap 134 may further be incorporated into a tie-down location for the seat back 106 or the seat bottom 104 that secures the finish trim layer 110 to the foam bun 114.

The insulating gaps—e.g., in the forms of the first and second insulating gaps 130 and 134, respectively—define a path for an electric current 138 through the semiconductor layer 124. As illustrated, the path of the electric current 138 flows through the alternating first and second semiconductor regions 126 and 128, respectively, between the top and bottom layers 120 and 122.

A non-limiting example path of the electric current 138 is illustrated in FIG. 2. As illustrated, the electric current 138 flows from a controller 140 for the thermal gradient assembly 116. The controller 140 controls the electric current 138 for the vehicle trim assembly 100 to produce a desired temperature. The electric current 138 flows alternately through the first and second semiconductor regions 126 and 128, respectively, of the semiconductor layer 124. The electric current 138 flows through the top and bottom layers 120 and 122, respectively, between the alternating first and second semiconductor regions 126 and 128, respectively.

As illustrated, the electric current 138 flows from a first portion 120A of the top layer 120, through a first portion 126A of the first semiconductor type, and to a first portion 122A of the bottom layer 122. The electric current 138 continues flowing from the first portion 122A of the bottom layer 122, through a first portion 128A of the second semiconductor type, and to a second portion 120B of the top layer 120. The pattern of current flow is then repeated. The electric current 138 flows from the second portion 120B of the top layer 120, through a second portion 126B of the first semiconductor type, to a second portion 122B of the bottom layer 122, from the second portion 122B of the bottom layer 122, through a second portion 128B of the second semiconductor type, and to a third portion 120C of the top layer 120. The pattern of the electric current 138 flowing between the top and bottom layers 120 and 122, respectively, and through the alternating first and second semiconductor regions 126 and 128, respectively, until the electric current 138 returns to the controller 140.

As illustrated, the thermal gradient assembly 116 has a series arrangement. Also as illustrated, the electric current 138 first and last flows through the top layer 120. Alternatively, the electric current 138 may first and/or last flow through the bottom layer 122.

The electric current 138 flowing through the alternating first and second semiconductor regions 126 and 128, respectively, generates a thermal gradient 142 across the thermal gradient assembly 116 according to the known Peltier effect. The thermal gradient assembly 116 is in a direction between the finish trim layer 110 and the foam bun 114 such that the Peltier effect heats or cools the finish trim 112.

Whether the thermal gradient 142 produces heating or cooling of the finish trim 112 (i.e., whether the thermal gradient assembly 116 acts as a heat source or a heat sink) depends on a polarity of the electric current 138 applied to the thermal gradient assembly 116. Thus, the thermal gradient assembly 116 may alternatively operate as a heat source and a heat sink by changing the polarity of the electric current 138. When the electric current 138 is a first polarity, the thermal gradient assembly 116 directs thermal energy as heat from the finish trim layer 110 to the foam bun 114, which cools the finish trim 112—i.e., the vehicle trim assembly 100 is a seat cooler for the vehicle seat 102. Alternatively, when the electric current 138 is a second polarity that is opposite the first polarity, the thermal gradient assembly 116 directs thermal energy as heat from the foam bun 114 to the finish trim layer 110, which heats or warms the finish trim 112—i.e., the vehicle trim assembly 100 is a seat heater or warmer for the vehicle seat 102.

As illustrated, the top and bottom layers 120 and 122, respectively, have a similar thickness in the Z direction. Alternatively, a bottom layer thickness 144 of the bottom layer 122 may be increased, while a top layer thickness 146 is maintained relatively thin, such that thermal energy transferred by the thermal gradient assembly 116 from the finish trim 112 is absorbed by the bottom layer 122. As such, with the increased bottom layer thickness 144, the bottom layer 122 may be configured as a thermal energy well to absorb the thermal energy without the thermal energy needing to otherwise be dissipated or dumped from the thermal gradient assembly 116. When the bottom layer 122 has a higher specific heat than the surrounding materials—e.g., the foam bun 114 or the semiconductor layer 124—thermal energy may be transferred to the bottom layer 122 without an equal increase in a temperature of the bottom layer 122. As a result, requirements for venting or other dissipation of the thermal energy transferred to the bottom layer 122 may be reduced.

Between the finish trim layer 110 and the thermal gradient assembly 116 is the thermal enhancement layer 118. As illustrated, the thermal enhancement layer 118 comprises first and second layers 148 and 150, respectively, extending in the X-Y plane. Alternatively, only one of the first and second layers 148 and 150, respectively, may be provided while the other is omitted. The thermal enhancement layer 118 has a high thermal conductivity.

The first layer 148 is a polyurethane (PUR) foam layer. The first layer 148 may be provided with or without additive material in the polyurethane foam. The additive material is thermally conductive materials that increase or otherwise enhance thermal transmission through the first layer 148. As non-limiting examples, the additive material in the first layer 148 may be graphite, metalized yarns or fabrics (such as metallized nylon fabric), or graphitic foam. As a non-limiting example, graphite is commercially available as sheets from Panasonic, as graphite foam from Poco Graphite or graphitic foam from UT Battelle at Oak Ridge National Laboratory. As a non-limiting example, the metalized yarns or fabrics are commercially available from Shieldex. An arrangement of the additive material in the first layer 148 is not limited to what is illustrated in FIG. 2.

The second layer 150 is a silicone rubber layer. As non-limiting examples, the silicone rubber layer is commercially available from Dow Corning or Shin-Etsu Chemical or as CoolPoly Thermally Conductive Elastomers from Celanese. The second layer 150 may be provided with or without filler material in the silicone rubber. The filler material in the second layer 150 are thermally conductive materials that increase or otherwise enhance thermal transmission through the second layer 150. As non-limiting examples, the filler material in the second layer 150 may be graphene, carbon, micro-porous ceramic beads, or microporous copper foam. As a non-limiting example, the copper foam is commercially available from Versarien Technologies. An arrangement of the filler material in the second layer 150 is not limited to what is illustrated in FIG. 2.

The thermal enhancement layer 118 has a thermal conductivity, indicated generally at 152, between the thermal gradient assembly 116 and the finish trim layer 110. The thermal conductivity 152 directs thermal energy transfer between the thermal gradient assembly 116 and the finish trim layer 110. As non-limiting examples, the thermal conductivity 152 directs thermal energy to the thermal gradient assembly 116 from the finish trim 112 to cool the finish trim 112 or from the thermal gradient assembly 116 to the finish trim 112 to heat the finish trim 112. The additive material in the first layer 148 and the filler material in the second layer 150 each assist the thermal conductivity 152 in directing the thermal energy transfer between the thermal gradient assembly 116 and the finish trim layer 110.

Where multiple thermal gradient assemblies 116 are used together on a particular seat (such as is illustrated in FIG. 1 with multiple vehicle trim assemblies 100), the thermal enhancement layer 118 may be matched to a size of the thermal gradient assemblies 116 in the X-Y plane and located only between each of the thermal gradient assemblies 116 and the finish trim layer 110. The thermal enhancement layer 118 would not be a continuous layer for an entirety of, for example, the seat back 106 or the seat bottom 104. Alternatively, the thermal enhancement layer 118 may be sized larger than the thermal gradient assemblies 116 in the X-Y plane and extend beyond the thermal gradient assemblies 116. In this case, the thermal enhancement layer 118 may be provided as a continuous layer for an entirety of, for example, the seat back 106 or the seat bottom 104 in the X-Y plane. The thermal enhancement layer 118 may be provided above, below, or both above and below the thermal gradient assemblies 116.

Channels 154 are provided in the vehicle trim assembly 100 for fluid circulation. As a non-limiting example, the fluid is air, although other fluids may also be used. The fluid circulates in the channels 154 to remove, dump, or otherwise dissipate thermal energy from the vehicle trim assembly 100 i.e., the thermal gradient assembly 116 and the foam bun 114. As a non-limiting example, the channels 154 may be open to a passenger compartment of the vehicle such that the thermal energy is vented to the passenger compartment. As a further non-limiting example, a fan may circulate the air through one or more of the channels 154. When the finish trim layer 110 is perforated, the channels 154 and a fan may be used to remove moisture from the finish trim 112. Thus, the conductive heat transfer through the vehicle trim assembly 100 is coupled with convective heat transfer using the channels 154.

As illustrated, the air channels 154 are provided through the top layer 120, the bottom layer 122, and the foam bun 114, as well as on an outward surface of the foam bun 114. The channels 154 may be piping or tubing placed through or beneath the vehicle trim assembly 100. Alternatively, the channels 154 may be formed during molding of the top layer 120, the bottom layer 122, and/or the foam bun 114 without additional structure such as piping or tubing in the completed vehicle trim assembly 100.

The channels 154 may be provided other than as illustrated. More or fewer than the channels 154 illustrated may be provided, or all of the channels 154 may be omitted. Fewer of the channels 154 may be provided when the bottom layer 122 is configured as a thermal energy well. Alternatively, when the top and/or bottom layers 120 and 122, respectively, are fabricated from reticulated foam or spacer fabric, the channels 154 may be omitted and the fluid circulated through the porous reticulated foam or spacer fabric.

Thermal devices 156 are provided between the foam bun 114 and the thermal gradient assembly 116. The thermal devices 156 are preferably single devices or assemblies that are selectively operable as heat sources or heat sinks i.e., the thermal devices 156 are preferably heat sources/sinks. The thermal devices are supported by the foam bun 114 and in thermal communication with the thermal gradient assembly 116. The thermal devices 156 may be heat sources or sinks as known to those skilled in the art, such as radiator fins. The thermal gradient 142 produced by the thermal gradient assembly 116 directs transferring of thermal energy to or from the thermal devices 156 to cool or heat the finish trim 112. The thermal gradient assembly 116 boosts or otherwise improves performance of the thermal devices 156.

More or less than the illustrated quantity of thermal devices 156 may be provided. Alternatively, the thermal devices 156 may be omitted from the vehicle trim assembly 100. The thermal devices 156 may be encased or otherwise contained within the foam bun 114 or have at least a portion extend outwardly from the foam bun 114.

Figure 3:
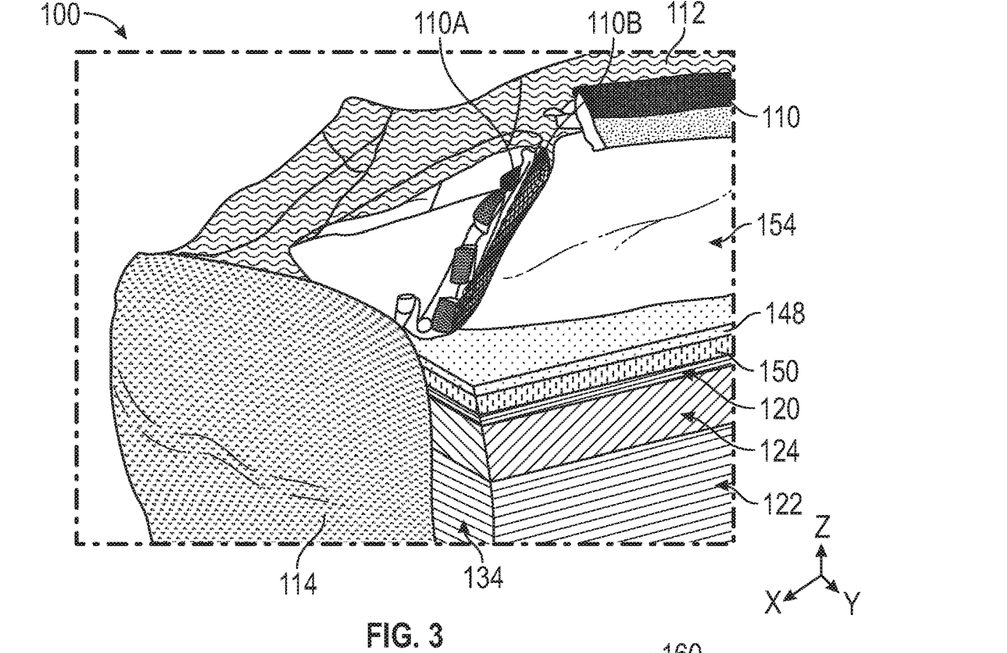
FIG. 3 is a perspective view of the vehicle trim assembly of FIG. 1.

Referring now to FIG. 3, there is illustrated the vehicle trim assembly 100 with the finish trim layer 110 partially pulled back from the foam bun 114. The finish trim layer 110 includes a thermally conductive trim layer, indicated generally at 158. As non-limiting examples, the conductive trim layer 158 may be fabricated from scrim, polyethylene film (PE) film, foam, or other surface materials. The conductive trim layer 158, is provided on an underside of the finish trim 112 between the finish trim 112 and the thermal gradient assembly 116. The conductive trim layer 158 is bonded with the finish trim 112 and provides a substrate or other structure to support the finish trim 112 on the thermal gradient assembly 116. Alternatively, the conductive trim layer 158 may be provided separately from the finish trim layer 110.

When the thermal enhancement layer 118 is included, it is positioned between the conductive trim layer 158 and the thermal gradient assembly 116. Alternatively, the conductive trim layer 158 may be omitted from the vehicle trim assembly 100. Alternatively, the conductive trim layer 158 may be provided separately from the finish trim 112. Such may be preferable when the thermal enhancement layer 118 is omitted.

As illustrated, the vehicle trim assembly 100 has a single layer of the thermal gradient assembly 116 and a single layer of the thermal enhancement layer 118. Alternatively, the vehicle trim assembly 100 may have multiple layers of the thermal gradient assembly 116 and/or the thermal enhancement layer 118.

Figure 4:
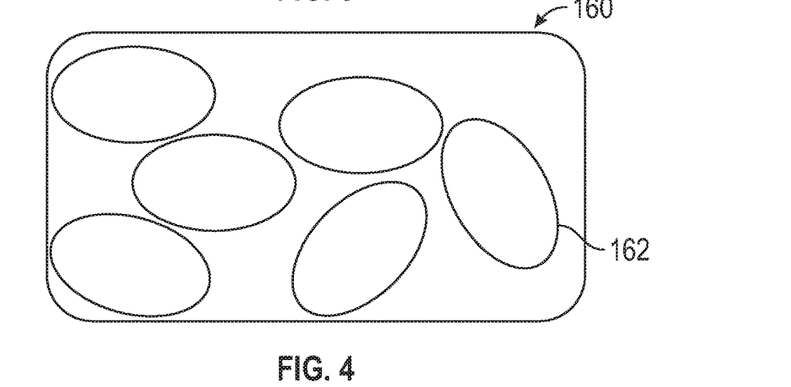
FIG. 4 is a schematic cross section showing a semiconductor layer as an extrinsic foam material for the thermal gradient assemblies of FIG. 2.

Referring now to FIG. 4, there is illustrated an extrinsic foam material, indicated generally at 160, from which the first and second semiconductor regions 126 and 128, respectively, may be fabricated. The extrinsic foam material 160 contains doped particles 162 suspended in the extrinsic foam material 160—i.e., a semiconductive foam material is doped with the particles 162. As a non-limiting example, the doped particles 162 may be doped as n- or p-type particles such that the extrinsic foam material 160 is an n- or p-type semiconductor. Both the first and/or second semiconductor regions 126 and/or 128, respectively, may be fabricated using the extrinsic foam material 160 and doped particles 162. When fabricated from the extrinsic foam material 160, each of the first or second semiconductor regions 126 or 128, respectively, have a corresponding single type of the doped particles 162. Alternatively, only one of the first or second semiconductor regions 126 and 128, respectively, may be fabricated using the extrinsic foam material 160 and doped particles 162. Alternatively, the first and/or second semiconductor regions 126 and/or 128, respectively, may be fabricated from other than the extrinsic foam material 160 and doped particles 162.

Figure 5:
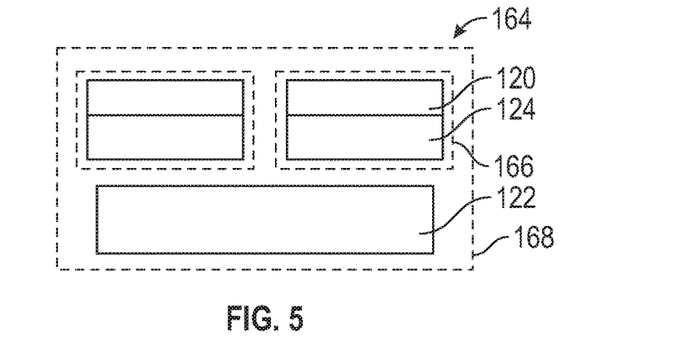
FIG. 5 is a schematic view showing fabrication of the thermal gradient assemblies of FIG. 2.

Referring now to FIG. 5, there is schematically illustrated a fabrication, indicated generally at 164, of the thermal gradient assembly 116 made by a foam molding tool. In a first step, the semiconductor layer 124 is fixed inside the foam molding tool and the top layer 120 is then molded with the semiconductor layer 124 to form a first assembly 166. Next, in a second step, the first assembly 166 is molded with the bottom layer 122 to form a final, second assembly 168 that is the thermal gradient assembly 116. The first and second assemblies 166 and 168, respectively, are molded to include the insulating gaps.

Alternatively, the thermal gradient assembly 116 may be formed in a single molding operation—i.e., monolithically—using a multi-density foam molding process. Furthermore, the foam bun 114 may be formed in a single molding operation with the thermal gradient assembly 116 using the multi-density foam molding process. During the multi-density foam molding process, layers of foam having different densities, including the doped extrinsic foam material 160, are injected into a single mold.

Figure 6:
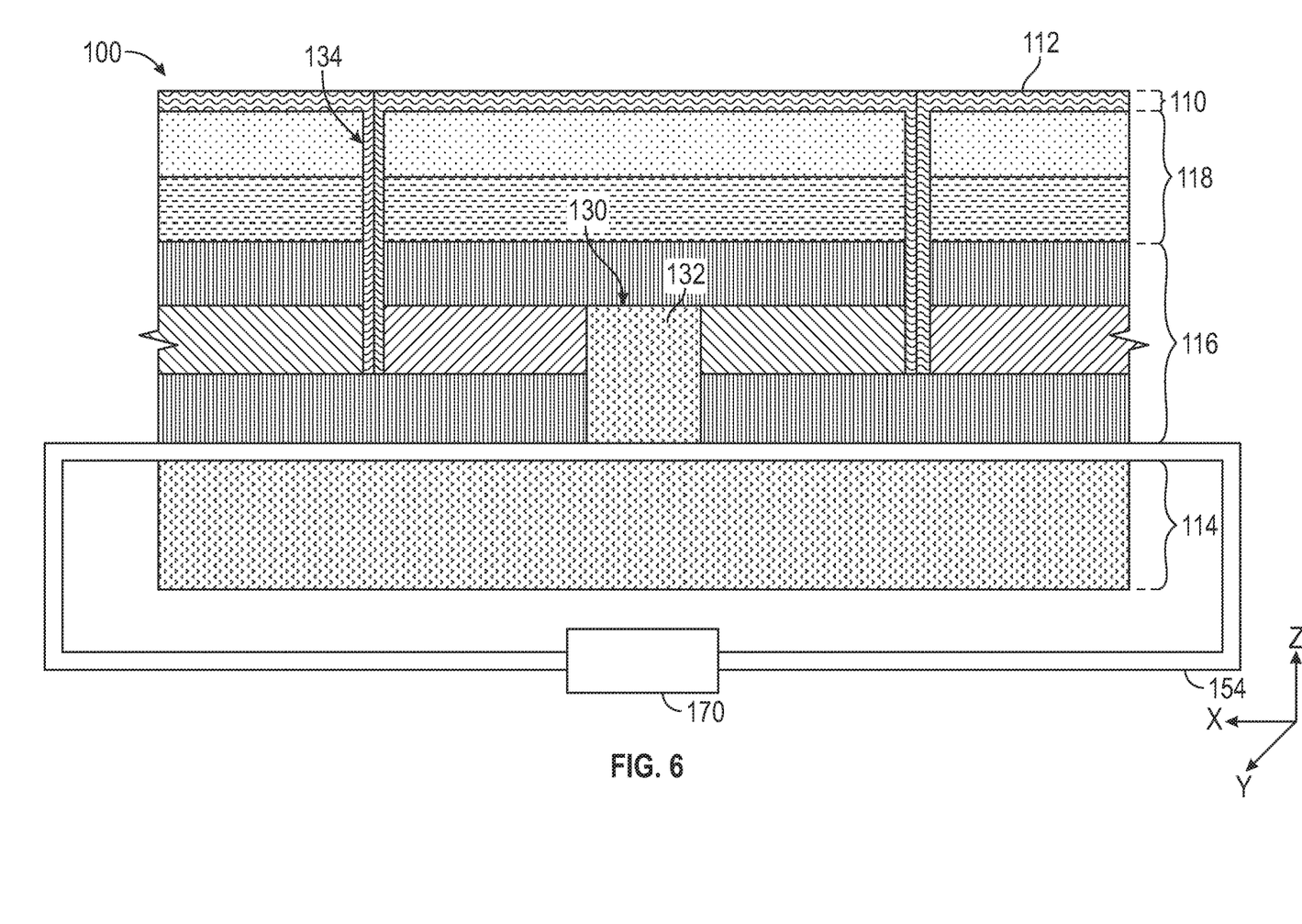
FIG. 6 is a schematic cross section of a vehicle trim assembly according to another embodiment of the present invention and having a thermal gradient assembly in thermal communication with a thermal device.

Referring now to FIG. 6, there is illustrated the vehicle trim assembly 100 in thermal communication with an external thermal device 170 via the channel 154. The external thermal device 170 is external to the vehicle trim assembly 100. The external thermal device 170 may be a heat source or sink as known to those skilled in the art. The external thermal device 170 is preferably a single device or assembly that is selectively operable as a heat source or a heat sink—i.e., the external thermal device 170 is preferably a heat source/sink. Alternatively, the external thermal device 170 may be a single device or assembly that is operable as a heat source only or as a heat sink only. In such a case, two of the external thermal devices 170 may be provided with one operable as a heat source only and the other operable as a heat sink only.

A fluid in the channel 154 transfers thermal energy between the external thermal device 170 and the thermal gradient assembly 116. When the finish trim 112 is cooled, the fluid in the channel 154 transfers heat from the thermal gradient assembly 116 to the external thermal device 170. When the finish trim 112 is warmed, the fluid in the channel 154 transfers heat from the external thermal device 170 to the thermal gradient assembly 116.

Figure 7:
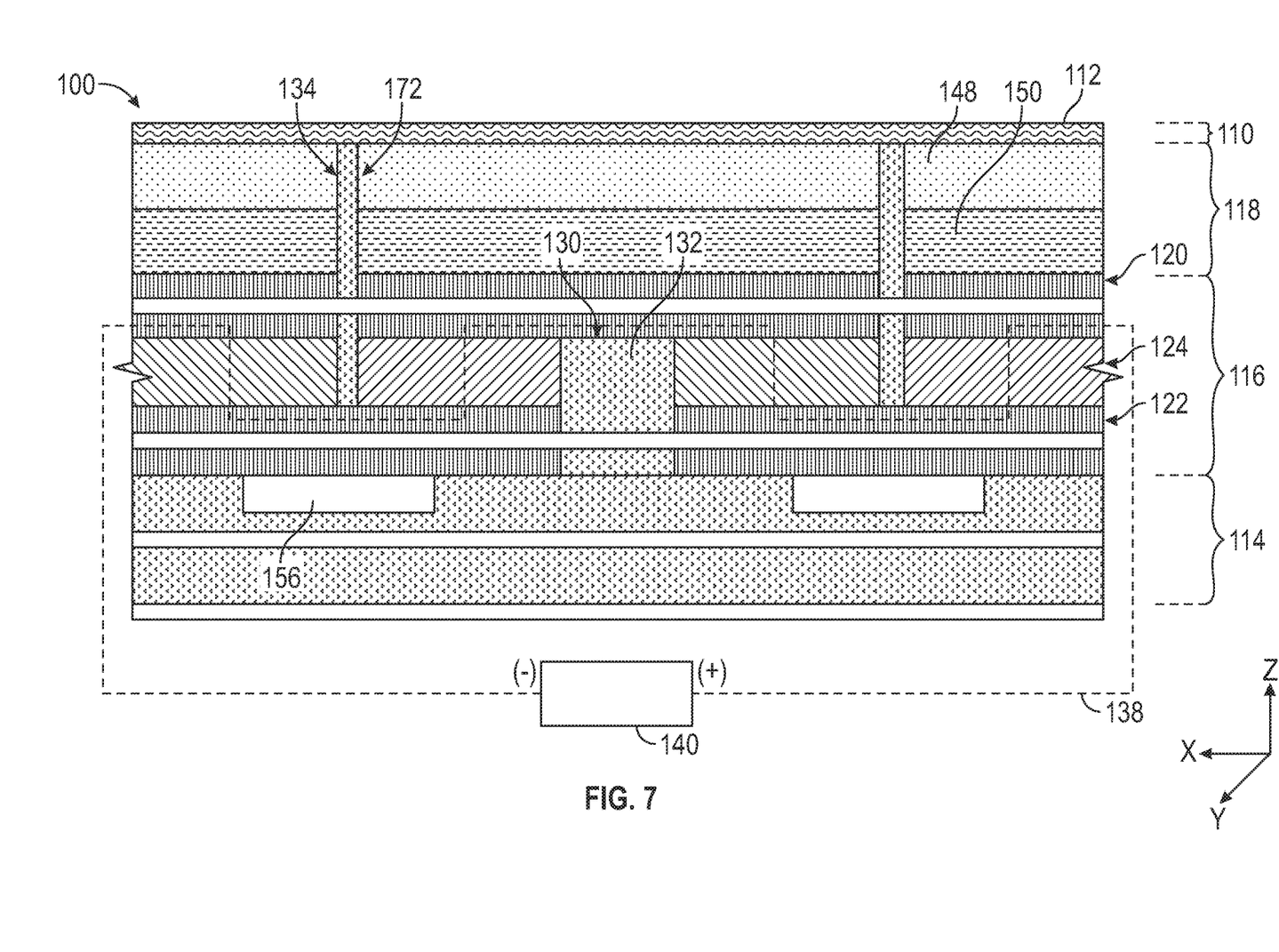
FIG. 7 is a schematic cross section of a vehicle trim assembly according to another embodiment of the present invention and having foam material interspaced with a thermal gradient assembly.

Referring now to FIG. 7, there is illustrated the vehicle trim assembly 100 in which the second insulating gaps 134 have insulating foam material, indicated at 172, in lieu of the finish trim 112 illustrated in FIG. 2.

Figure 8:
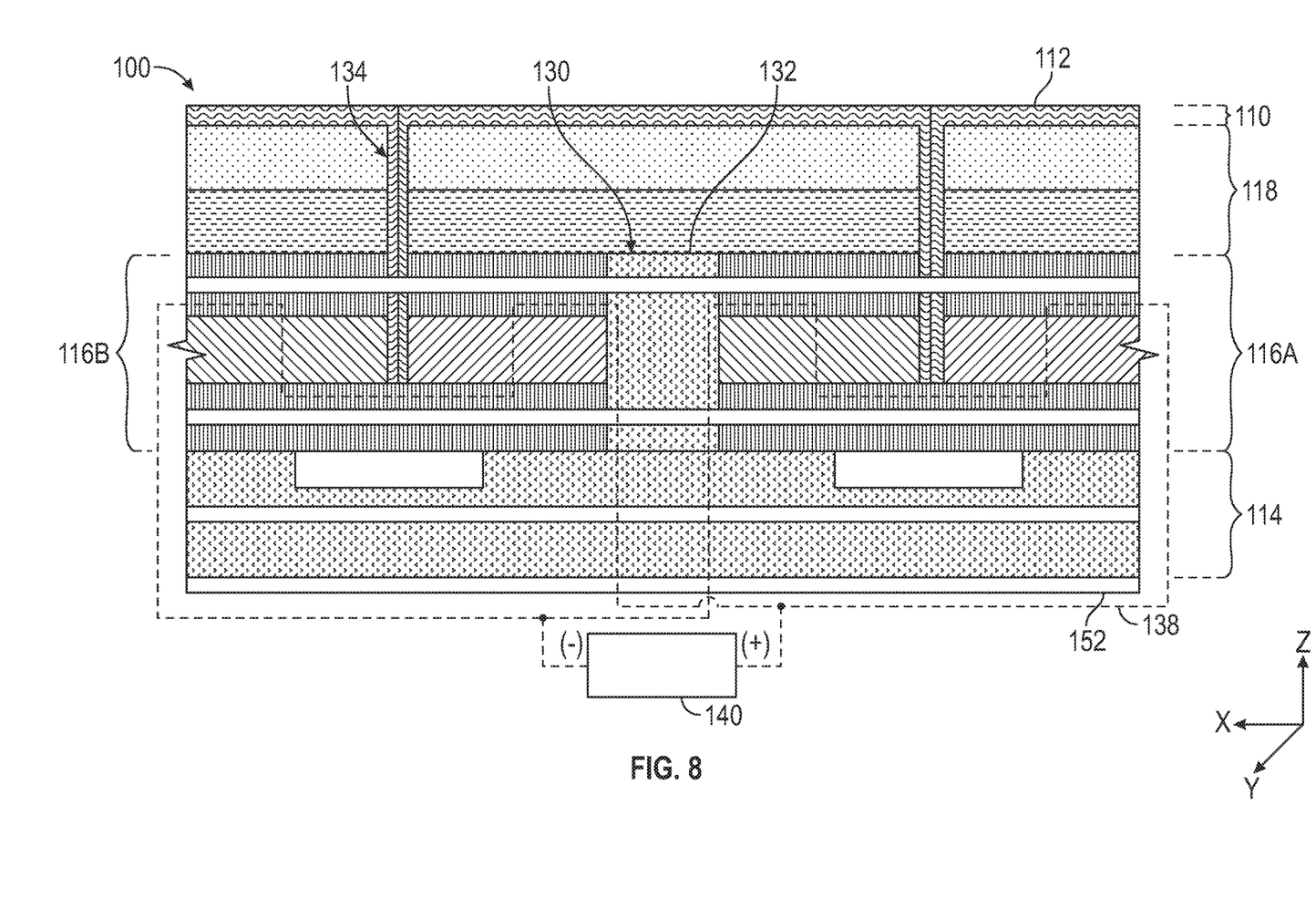
FIG. 8 is a schematic cross section of a vehicle trim assembly according to another embodiment of the present invention and having a parallel arrangement of a thermal gradient assembly.

Referring now to FIG. 8, there is illustrated the vehicle trim assembly 100 with a parallel arrangement of the thermal gradient assemblies 116. The foam insulating material 132 fully electrically insulates and separates first and second thermal gradient assemblies 116A and 116B, respectively. The first and second thermal gradient assemblies 116A and 116B, respectively, may be controlled independently by the controller 140.

Figure 9A:
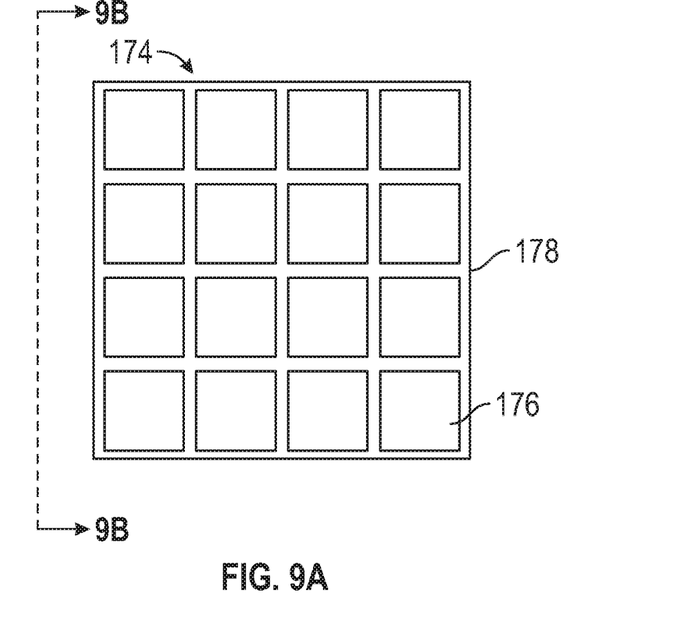
FIGS. 9A-9C are elevation views showing a semiconductor layer as a flexible sheet for a thermal gradient assembly of a vehicle trim assembly according to another embodiment of the present invention.
Figure 9B:
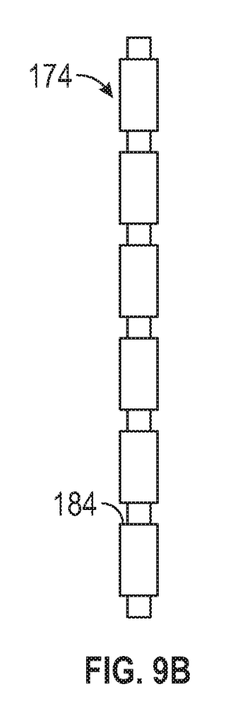
Figure 9C:
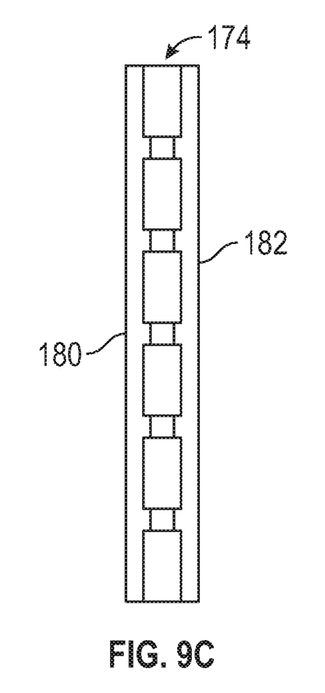

Referring now to FIGS. 9A-9C, there is illustrated a flexible semiconductor sheet, indicated generally at 174. The flexible sheet 174 flexes in the X-Y plane. The first and/or second semiconductor regions 126 and/or 128, respectively, may be fabricated from the flexible sheet 174. The flexible sheet 174 is an array or matrix containing doped chips 176. As a non-limiting example, the doped chips 176 may be doped as n- or p-type chips such that the flexible sheet 174 is an n- or p-type semiconductor. Both the first and second semiconductor regions 126 and 128, respectively, may be fabricated using the flexible sheet 174 and doped chips 176. When fabricated from the flexible sheet 174, the flexible sheet 174 for each of the first or second semiconductor regions 126 and 128, respectively, has a single type of the doped chips 176. Alternatively, only one of the first or second semiconductor regions 126 or 128, respectively, may be fabricated using the flexible sheet 174 and doped chips 176. The doped chips 176 are connected by a flexible substrate insulator grid 178. As a non-limiting example, the grid 178 may be fabricated from silicone.

The flexible sheet 174 is molded using first and second mold dies 180 and 182, respectively. The first and second mold dies 180 and 182, respectively, are sized to expose a face 184 of the doped chips 176. The flexible sheet 174 may be molded with a layer of conductive scrim material connecting the doped chips 176.

Figure 10:
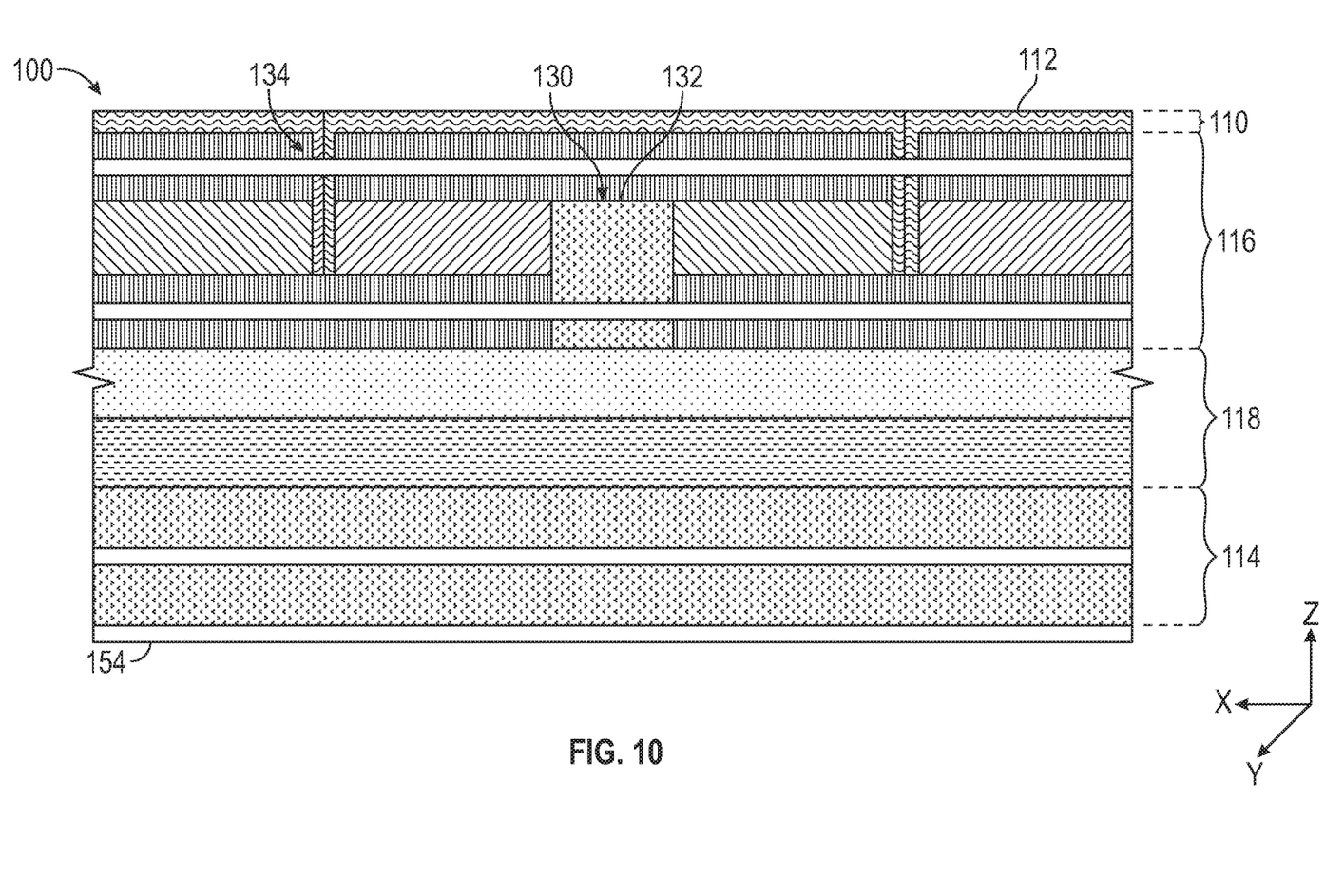
FIG. 10 is a schematic cross section of a vehicle trim assembly according to another embodiment of the present invention and having an alternative arrangement of a thermal gradient assembly and a thermal enhancement layer.

Referring now to FIG. 10, there is illustrated the vehicle trim assembly 100 with the thermal enhancement layer 118 positioned between the foam bun 114 and the thermal gradient assembly 116. Alternatively, the thermal enhancement layer 118 may be provided both between the finish trim layer 110 and the thermal gradient assembly 116 (as illustrated in FIG. 2) and between the thermal gradient assembly 116 and the foam bun 114 (as illustrated in FIG. 10). The thermal enhancement layer 118 may be positioned in the vehicle trim assembly 100 as desired to direct thermal energy transfer between material layers within the vehicle trim assembly 100 or between the vehicle trim assembly 100 and portions of the vehicle seat 102 outside of the vehicle trim assembly 100.

Figure 11:
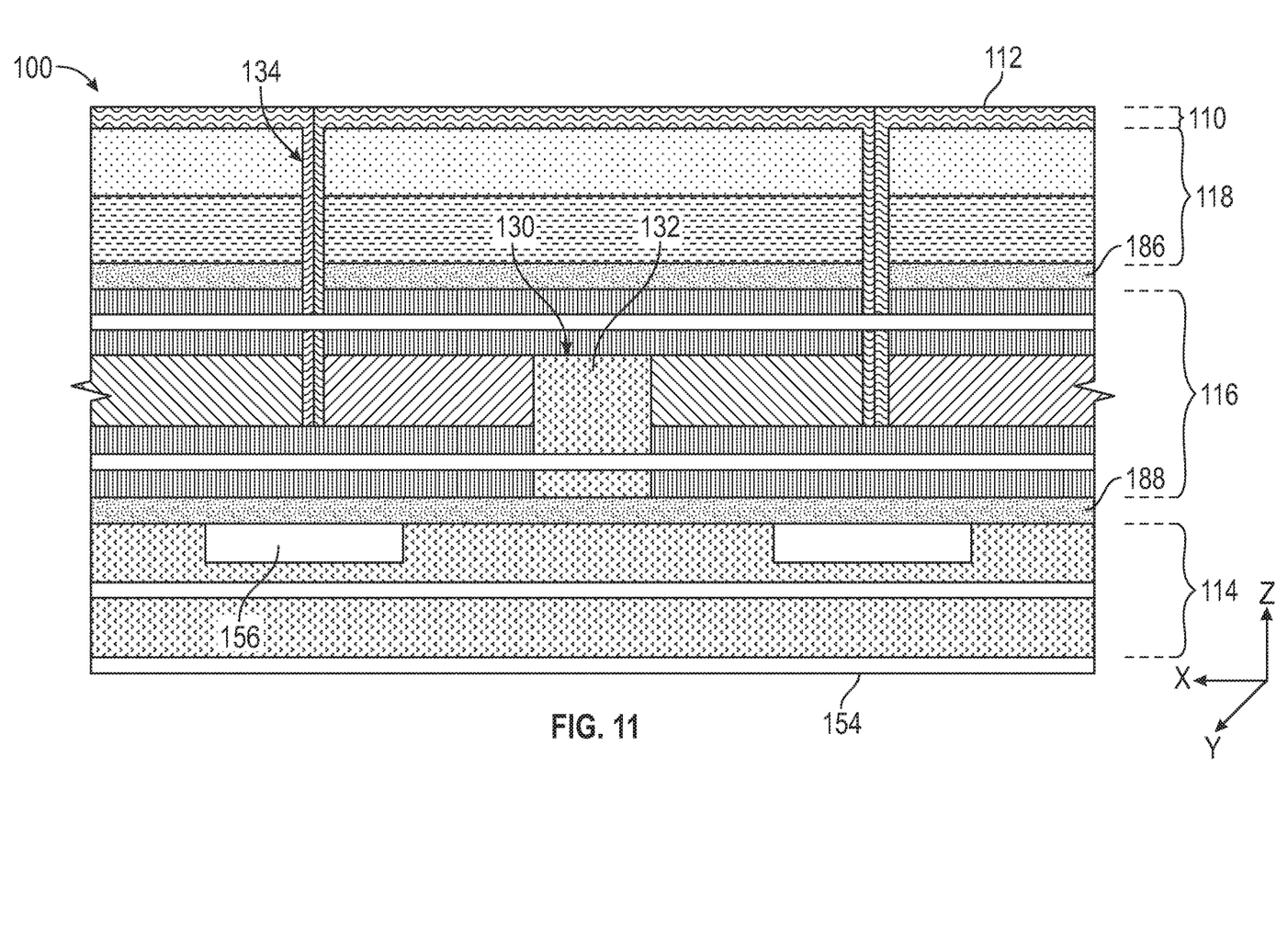
FIG. 11 is a schematic cross section of a vehicle trim assembly according to another embodiment of the present invention and having an adhesive securing a thermal gradient assembly in the vehicle trim assembly.

Referring now to FIG. 11, there is illustrated the vehicle trim assembly 100 with first and second adhesive layers 186 and 188, respectively. As non-limiting examples, each of the first and second adhesive layers 186 and 188, respectively, may be an adhesive glue or adhesive tape. The first adhesive layer 186 secures the thermal enhancement layer 118 and the thermal gradient assembly 116 together. When the thermal enhancement layer 118 is omitted, the first adhesive layer 186 secures the finish trim layer 110 and the thermal gradient assembly 116 together. The second adhesive layer 188 secures the foam bun 114 and the thermal gradient assembly 116 together. The first and second adhesive layers 186 and 188, respectively, may be used when one or more of the components of the vehicle trim assembly 100—i.e., the finish trim layer 110, the foam bun 114, thermal gradient assembly 116, and/or thermal enhancement layer 118—are fabricated separately and then assembled.

Alternatively, the thermal gradient assembly 116 may be incorporated into the foam bun 114, with or without the thermal enhancement layer 118. The combined foam bun 114 and thermal gradient assembly 116 may be used as an aftermarket part to replace a foam bun of an original equipment manufacturer (OEM) vehicle seat. A finish trim layer of the OEM vehicle seat may be secured to the combined foam bun 114 and thermal gradient assembly 116 using the first adhesive layer 184.

In accordance with the foregoing, a vehicle trim assembly has been described having significant advantages over the prior art. The vehicle trim assembly provides more efficient thermal heating and cooling for vehicle seats.

What is claimed is:

1. A vehicle trim assembly comprising:
   a foam bun;
   a finish trim layer above the foam bun;
   a thermal gradient assembly under the finish trim layer and adapted to generate a thermal gradient when receiving an electric current, the thermal gradient assembly having an electrically conductive top layer, an electrically conductive bottom layer, and a semiconductor layer having first and second semiconductor regions between the electrically conductive top and bottom layers; and a thermal enhancement layer between the thermal gradient assembly and the finish trim layer, wherein the thermal enhancement layer has a thermal conductivity adapted to direct thermal energy transfer between the thermal gradient assembly and the finish trim layer, wherein the thermal enhancement layer comprises a polyurethane foam layer;

wherein an insulating gap extends into the thermal gradient assembly between the first and second semiconductor regions, and the finish trim layer extends into the insulating gap.

2. The vehicle trim assembly of claim 1 further comprising additive material in the polyurethane foam layer, wherein the additive material directs the thermal energy transfer.

3. The vehicle trim assembly of claim 1 wherein the thermal enhancement layer additionally comprises a silicone rubber layer.

4. The vehicle trim assembly of claim 3 further comprising filler material in the silicone rubber layer, wherein the filler material directs the thermal energy transfer.

5. The vehicle trim assembly of claim 1 further comprising foam material between the first and second semiconductor regions.

6. The vehicle trim assembly of claim 1 further comprising a channel for fluid circulation through the vehicle trim assembly.

7. The vehicle trim assembly of claim 1 further comprising a heat source/sink in thermal communication with the thermal gradient assembly.

8. The vehicle trim assembly of claim 1 wherein the electrically conductive bottom layer is a thermal energy well.

9. The vehicle trim assembly of claim 1 wherein at least one of the first and second semiconductor regions is an extrinsic foam material containing doped particles.

10. The vehicle trim assembly of claim 1 wherein at least one of the first and second semiconductor regions is a sheet containing doped chips.

* * * * *

UNITED STATES PATENT AND TRADEMARK OFFICE
CERTIFICATE OF CORRECTION

| | |
|---|---|
| PATENT NO. | : 10,759,312 B2 |
| APPLICATION NO. | : 15/848428 |
| DATED | : September 1, 2020 |
| INVENTOR(S) | : Ashford Allen Galbreath et al. |

It is certified that error appears in the above-identified patent and that said Letters Patent is hereby corrected as shown below:

On the Title Page

Item (72) Inventors should be corrected to read: Ashford Allen Galbreath - Troy, MI (US); Arjun Yetukuri - Rochester Hills, MI (US); Paul Olivier - Mataro, Barcelona in Catalonia (ES); Colin Andrew Paton-Phillips - Bayern (DE); David Gallagher - Sterling Heights, MI (US); Jaime Fernandez-Caro - Valls, Tarragona in Catalonia (ES)

Signed and Sealed this
Twenty-eighth Day of February, 2023

Katherine Kelly Vidal
*Director of the United States Patent and Trademark Office*